Aug. 16, 1938. E. ROBERTS Re. 20,829

CENTRIFUGAL BASKET CONSTRUCTION

Original Filed Feb. 25, 1933

INVENTOR
EUGENE ROBERTS
BY
Hammond & Littell
ATTORNEYS

Reissued Aug. 16, 1938

Re. 20,829

UNITED STATES PATENT OFFICE 20,829

CENTRIFUGAL BASKET CONSTRUCTION

Eugene Roberts, Hastings, N. Y., assignor to The Western States Machine Company, Salt Lake City, Utah, a corporation of Utah Original No. 1,992,964, dated March 5, 1935, Serial No. 658,544, February 25, 1933. Application for reissue November 19, 1936. Serial No. 111,645

10 Claims. (Cl. 210—76)

This invention relates to baskets for centrifugal separators of the type used in the manufacture of sugar, starch and various chemicals, particularly sugar refining, and is intended to provide a construction of basket that shall be free from faults inherent in the type of construction that has previously been known and used in such centrifugals.

According to the practice heretofore followed a perforated metallic sheet of appropriate length and thickness was rolled into cylindrical form and its abutting edges were fastened together by means of butt straps. The perforations in the sheet extended close to the top and bottom edges and were arranged in circumferential perforated areas separated by intermediate circumferential areas that were left imperforate for the reception of external reenforcing hoops. Said abutting ends were fastened together by a series of vertically spaced butt straps which were curved of sheet material as thick, or thicker than the basket wall overlapping the perforated areas for several inches on each side of the joint or crack in the basket wall. These straps were secured to the wall by multiple rivets passed through perforations in their ends that were in registry with corresponding perforations in the basket wall. To balance the basket, it was necessary to apply two additional sets of similar straps 120 degrees from the butt straps and fastened to the basket also by rivets.

The top and bottom elements of the basket were then applied to the corresponding edges of the basket wall in lapped relation thereto and were fastened to it by bolts, pins or rivets. The reenforcing hoops passed between the individual straps of each row of butt straps.

For many years the baskets in use have been of this type of construction, their operation in service was attended by a very considerable waste of material being treated. Not only were the baskets subject to leakage around the top and bottom edges of their filter linings, but unless the sugar being centrifuged was subjected to excessive application of wash water there would be found rings and patches of discolored sugar due to imperfect purging and washing. Now, it is well known that each pound of wash water sprayed against the sugar wall, after purging, carries off in solution about three and one-half pounds of sugar, if cold water be used. If hot water be used numerous refiners prefer it because it more quickly picks up the scum) the loss of sugar is considerably increased when following conventional centrifuging practices. Moreover, imperfect drainage prolongs the purging period, that is, the centrifugal extraction of the original syrup or liquor with which the grains were mixed, and makes the washing operation longer and more difficult.

After careful study of and experiment with centrifugals in attempting to learn the causes of these troubles, I have discovered that the large percentage of waste involved in the operation of such centrifugal baskets was due to several faulty features of construction, whose disadvantages have been entirely overlooked heretofore. The importance of uniform drainage throughout the whole perforated area of the basket wall has not been appreciated or, if it has been, no basket construction has been provided to secure that advantage. In the first place, the use of butt straps and counterbalance straps, as well as the use of over-lapping flanges forming top and bottom riveted joint connections with the basket wall, has resulted in doubling the thickness of the basket wall at such locations with the consequence that the depth or radial length of the outlet perforations in the double thickness areas was also doubled. Careful tests have shown me that these longer outlet perforations tend to gum up or accumulate sticky material until their discharge capacity is very greatly reduced. In addition to this, some of the holes are closed by the attaching rivets. Therefore, substantial areas of the basket wall will have less than half the freedom of drainage that equal areas in other parts of the basket have. The result is that after purging and moderate washing there will be found discolored streaks and patches of sugar, which are highly objectionable as such sugar is of inferior grade. On the other hand, if these discolored areas are washed out by sufficient washing the portions of the sugar wall having freer drainage become excessively washed, involving excessive wastage, which is also highly uneconomical and objectionable.

By means of the construction hereinafter described I have eliminated perforated areas of double thickness of basket wall and have also eliminated the use of fastening rivets which have been used for fastening overlapped perforated members together and which necessarily close a considerable number of such perforations and have thereby secured, for the first time in this art, a perforated centrifugal basket for sugar centrifugals and the like which has substantially uniformly spaced outlet perforations of uniform depth or radial length so that all portions of the perforated area of the basket wall possess equal drainage facilities, thereby avoiding the occurrence of dark or discolored areas of sugar and at the same time using a markedly decreased application of wash water, largely reducing previous wastage. Moreover, by reason of the equal and free drainage thus secured, the purging can be accomplished more perfectly and more quickly than before, which of itself aids in dispensing with the use of considerable quantities of wash water, since much of the scum is carried off by the freely flowing liquor or syrup extracted in the first portion of the run before the wash spray is applied.

Waste of material through leakage around the top and bottom edges of the basket filter linings is avoided by spacing the top and bottom rows of perforations a substantial distance from the top and bottom elements, thereby providing a smooth unbroken surface of sufficient extent to form an adequate support for the selvage edged linings with which these smooth unbroken top and bottom margins or selvage areas of the basket wall form an effective seal permitting the use of linings that are slightly shorter in vertical height than the vertical distance between the top and bottom elements next to the basket wall. Besides providing a perfect sealing seat for the top and bottom edges of the lining, these smooth unbroken selvage areas serve to prolong the life of the fine linings. According to the practice heretofore followed, these linings are crowded tightly against the top and bottom in the effort to prevent leakage of material at those points, and they become bent and crumpled at their edges under pressure exerted by the discharger plow, which is a prolific source of damage to the linings. Another important disadvantage of the prior practice is that top and bottom edges of the linings, under the tremendous pressures encountered in high speed centrifugal operations, become buckled due to deforming of the lining at points closely adjacent the edges, into improperly placed perforations of the basket wall. When this occurs the lining permits leakage and fails properly to perform its filtering functions. According to my invention, however, the smooth unbroken surfaces adjacent the top and bottom margins of the basket wall provide facilities for the sealing of the margins of the lining thereto during rotation of the centrifugal, enable the avoidance of all distortion and buckling of the lining and thus prevent damage, leakage and improper filtration. Moreover, the selvage margin areas of the basket wall afford a much stronger and more reliable joint with the top and bottom elements of the basket than was obtained by previous constructions.

These and other features of the invention will be particularly described in the following specification and will be defined in the claims hereto annexed.

In the accompanying drawing I have illustrated a preferred form embodying the principles of this invention, in which Fig. 1 is a side elevation, partly in central section, of my improved basket construction showing the basket in its relation to the surrounding curb or casing.

Figure 3:
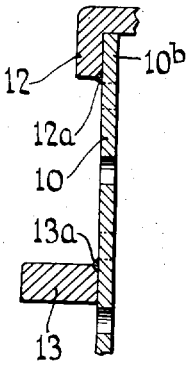
Fig. 3 is an enlarged detail showing a vertical section through the upper portion of the basket wall and top.
Figure 3A:
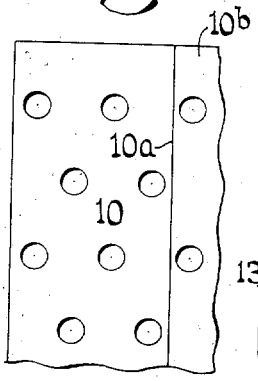

Fig. 3*a* is a detail showing in elevation on the same scale as Fig. 3 the arrangement of perforations of the basket wall.

Figure 4:
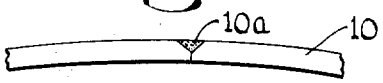

Fig. 4 is an enlarged detail in plan of the abutting ends of the sheet forming the peripheral wall with their uniting welding seam indicated.

Figure 5:
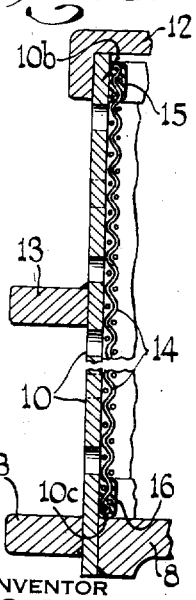
Figure 2:
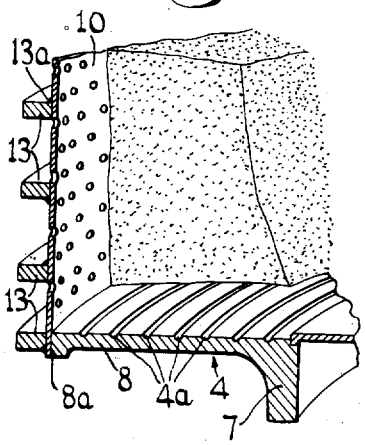
Fig. 2 is a detail showing in perspective on a larger scale the joint between the bottom and the basket wall and illustrating the calibration of the bottom for the purpose of ascertaining the thickness of the sugar wall as the basket is being loaded.

Fig. 5 is a vertical section through the wall of the basket showing a filter lining in cooperative relation thereto, the lining being shown in exaggerated scale.

In the practice of this invention I avoid double thickness of the perforated area of the basket wall by elimination of the butt straps and counterbalance straps and of overlapping joints having outlet perforations by making the basket of completely integral construction, thereby securing uniform depth of the outlet perforations and substantially uniform distribution or spacing of such perforations throughout the perforated area of the basket, so that equal and rapid drainage is afforded to all portions of the perforated area of the basket while at the same time I provide a lighter and a stronger and more reliable basket construction.

I will now describe in detail the features of construction and arrangement by which these important advantages are secured. The suspension shaft 1 of the centrifugal, according to usual practice, is provided at its lower end with a frusto-conical enlargement 2 and a downward extension **2*a* of reduced diameter for the purpose of receiving the hub 6 concentric with the radial arm spider 5, which sets over the bottom extension 2*a* and is fastened thereto by bolts tapped into the enlarged head 2** of the spindle.

I provide a novel construction of spider for the basket bottom by thickening the interior hub member 6 of the spider and the peripheral ring 7 of the spider and by reason of this extra thickness at these two points of greatest strain I am able to shorten the vertical depth of the peripheral ring 7 sufficiently to allow this ring, when the basket gyrates, to swing over the top of the interior flange **20*b* bounding the central discharge opening in the bottom 20*a* of the curb or casing. This upward inclination of the spider 5**, with the corresponding thickening of the hub and peripheral ring thereof, makes it possible to provide a collecting trough or ring for the bottom of the curb or casing of much greater width than was practicable with previous constructions in this type of centrifugal without sacrifice of strength.

The perforated basket wall 10 comprises a metallic sheet provided with substantially uniformly spaced and dimensioned perforations throughout the whole perforated area of the basket, while at the same time providing at the top and bottom marginal portions of the basket wall selvages or imperforate areas **10*b* and 10*c* for the reception of marginal portion of a lining or backing, such as, for example, the lining which forms the subject matter of a companion application, Serial No. 654,042, filed January 28, 1933, now United States Letters Patent No. 1,946,500, and thereby prevents leakage of the material around the linings at the top and bottom edges thereof. Not only is the pitch or center to center distance from one perforation to the next in the same row of perforations the same, but the pitch or distance from center to center of successive rows of perforations is substantially uniform throughout, and in consequence thereof there is uniform and equal drainage throughout the basket for the escape of the centrifugally extracted liquid. Furthermore, the radial depth of all perforations in the basket is uniform throughout, since there are no rows of butt straps secured to the basket wall and no rivets plugging a substantial number of the perforations by reason of the construction that will now be explained The perforated sheet is rolled into cylindrical form and its opposing ends are cut off true and even and bevelled at their edges, and are then drawn tightly together by circumferential clamps provided with draw bolts. These abutting ends of the sheet 10**, while the shell is held in cylindrical form, are then welded together throughout the length of the seam from top to bottom, thus making an integral connection between the two ends. The inside and the outside surfaces of the welded seam are then ground smooth. This, in substance, gives a peripheral wall of uniform thickness in each horizontal plane, equivalent in form and characteristics to a wall made of an integral unbroken annular sheet of metal.

The top and bottom edges of the integral cylindrical sheet to form the basket wall are then turned to form a snug fit with the top and bottom elements of the basket; the bottom is then forced into the inside of the bottom edge until its outer edge lies flush with the bottom edge of the shell; the top ring 12 is then crowded over the top edge against intervening vertical spacers and the top and bottom are then drawn together against the intervening spacers to secure exact parallelism as well as proper engagement with the edges of the basket wall. Then thus exactly positioned with reference to each other and to the basket wall, the top and bottom elements are exactly equi-distant from each other all around the basket and a continuous welded seam is made between the bottom and top elements while they are held in that relation. In the case of a steel basket, the continuous welded seat at top and bottom will preferably be formed by arc welding. In case of bronze or similar alloys the welding is preferably done by oxyacetylene method of welding.

The hoops 13 are turned or machined inside to slightly smaller dimension than the periphery of the basket wall and are then heated and forced over the basket wall in proper spaced relationship insured by temporary spacers. These hoops are shrunk tightly on the basket wall by cooling and are held against accidental displacement by spot welding at intervals around the basket wall, as shown at 13*a*, such spot welding preferably being made alternately on the top and bottom sides of the hoops. The bottom hoop is the last to be applied and after its application is integrally welded to the bottom marginal portion of the basket wall by a continuous welding seam extending entirely around the bottom. As the basket bottom has already been integrally united with the inside face of the lower edge portion of the basket wall by a continuous welding seam, as above explained, this continuous welding of the bottom hoop forms, in effect, a peripheral integral extension of the bottom member and therefore the shocks, caused by its impact against the surrounding wall of the curb or casing as the basket gyrates or sways, are transmitted directly to the basket spindle and there is no danger of the hoop becoming loosened and dropping off, which occasionally happens with consequent damage to the basket when the hoop is secured in place only by pins.

By the above described method of construction applicant has produced a centrifugal basket of integral construction and light weight which is not only superior in strength but which effects a much more complete and satisfactory drainage than in the case of previous constructions, and also makes provision for the elimination of leakage of material to be purged around the top and bottom edges and permitting the use of a collecting trough for the liquid of any desired width instead of being restricted to the narrow widths heretofore necessitated by previous constructions. There are no rivets to shear or to clog drainage openings and no butt straps to impair complete efficiency of drainage. Because of the strong but compact construction of baskets made as above described and their light weight as compared with centrifugal baskets heretofore used, my improved baskets are especially advantageous for use in high speed centrifuging processes which I have developed.

Figure 1:
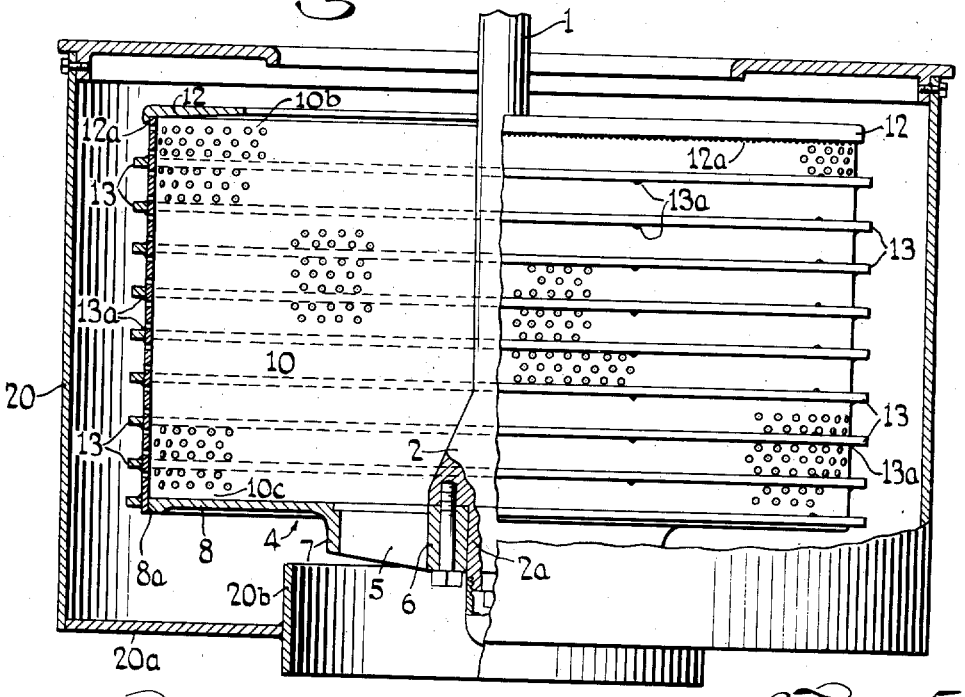

Referring to Figure 1, the perforations in the basket wall are arranged in parallel rows with the perforations of one row substantially equidistant from each other and offset substantially equi-distant from those of the rows next adjacent thereto. The size of the perforations and the distances therebetween are such as to enable quick and uniform purging of the sugar without clogging, loss of sugar, or distortion of the basket lining into the perforations. The distances between certain adjacent rows, however, provide room for attachment of the reenforcing hoops 13 therebetween without overlapping the perforations or otherwise interfering with the flow of liquid from the basket. While the basket of Figure 1 includes eight hoops intermediate the bottom 4 and the top ring 12, this is only one particular construction. It is apparent that more or less hoops might be used, and that the dimension of the basket may be varied as desired. Even when the reenforcing hoops are used, however, the basket constructed according to my invention provides substantially uniform drainage facilities in the area of the basket wall lying on both sides of one hoop and bordered by the two hoops on opposite sides thereof.

The outer portion 8 of the basket bottom 4 is provided with a series of accurately spaced gauging grooves or rings 4*a* so that the centrifugal operator or attendant is guided accurately in loading the basket. These calibrating or gauging rings 4*a* will preferably be located an inch apart, the outer one of these being one inch, or unit of measurement, from the inside of the basket wall, so that if it is known that the inner ring of any given basket, for example, is 7 inches away from the basket wall and it is desired to load some particular material into the basket to a thickness of only 5 inches, the operator will know when the material has built out to the third ring, counting from the inside, he has a wall thickness of 5 inches and correspondingly any other desired thickness may be indicated by similar manner, thus enabling the operator to load to any desired thickness of wall according to the material that is being purged. A further important advantage of the visible calibrating of the basket bottom is that it makes possible the accurate ascertainment of the amount of shrinkage in the thickness of the bottom portion of the sugar wall, thereby affording a check on excessive washing or leakage of material. When the material being centrifuged is loaded into the basket it builds up into a vertical annular wall inside of the outside wall of the basket and normally this walled up ring of material is thicker at the bottom than at the middle and top portions and therefore should receive a slightly greater supply of wash fluid than the upper portions of the walled up ring receive. Therefore, by providing a calibrating means on the bottom the shrinkage can be checked up for the purpose of determining precisely how much more spraying is required over this area and also to detect the fact of over-spraying which will cause excessive shrinkage and consequent waste.

In actual practice I have made the imperforate marginal portions 10b and 10c of the perforated basket wall at top and bottom more than one-half inch in width, or substantially wider than the radius of the drainage areas for the individual outlet perforations, although this dimension is not prescriptive. These smooth marginal or selvage areas of the basket wall afford a smooth uninterrupted annular seat at top and bottom forming a continuous sealing support for the upper and lower selvage edges 15 and 16 of the basket filter lining 14 as shown in Fig. 5. This is important because baskets, as previously constructed with the top and bottom rows of outlet perforations very close to the top and bottom elements of the basket, I have found are a prolific source of leakage of material at these points, due to buckling or distortions of the lining caused by the pressing of parts thereof into these perforations during centrifuging operations. Furthermore, in the attempt to lessen leakage it has been customary to endeavor to fit the finely perforated filter linings snugly between the top and bottom walls with the result that this fine lining has become curled up or distorted under the pressure of the discharger plow so that leakage of material at both top and bottom occurs. When the above described marginal selvages are used, it is unnecessary to have the finely perforated filter lining fit snugly between the top and bottom of the basket, and these may be made slightly shorter than the vertical distance between top and bottom to allow for expansion. The sealing at top and bottom is effected by the smooth and sealing contact of the selvage portion of the outer lining or backing with these smooth selvage areas of the basket wall under the centrifugal force created by rotation of the basket. In this manner buckling and distortion of the lining edges and consequent leakage are prevented, and the life or duration of the fine filter linings is very greatly prolonged, thus reducing the cost of maintenance of the centrifugals in operation. To get the fullest advantage of these imperforate selvage areas I have devised an improved basket lining 14 having top and bottom sealing selvages as shown at 15 and 16, Fig. 5, which is claimed specifically in my patent referred to above, but the advantages of the present invention obviously may be obtained with other linings capable of cooperating with the basket wall as described herein.

By shortening the outer ring of the bottom spider with compensating thickening of the ring, new baskets of this construction may be mounted in wide trough casings without narrowing the diameter of the spider and without changing the vertical depth of the basket, while at the same time avoiding the objectionable impact of the outside ring of the spider with the flange ring of the casing which has necessitated the narrowing of the collecting trough of the curb to an undesirable extent.

I claim:

1. A centrifugal basket of the type described comprising appropriate top and bottom members and a perforated peripheral wall integrally united therewith, said wall comprising a heavy metallic sheet bent into cylindrical form with its abutting end edges integrally welded together and having substantially uniformly spaced outlet openings, all of which are of equal radial depth throughout whereby equal and uniform drainage is afforded for the escape of the centrifugally extracted liquid from the walled up material in the basket.

2. A centrifugal basket of the type described comprising a perforated peripheral wall of uniform thickness throughout, thereby providing outlet perforations of uniform depth radially of the basket, and top and bottom elements united therewith, the top and bottom rows of perforations being spaced a substantial distance from said top and bottom elements to leave a smooth unbroken annular selvage area of adequate width to form a smooth sealing contact with the subtending sealing selvages of an inserted basket lining, thus preventing leakage of material around the top and bottom edges of the lining.

3. A centrifugal basket comprising a perforated sheet of annular form having its opposite end edges welded together in abutting relation, thereby providing a perforated wall of uniform thickness having outlet perforations of equal radial depth throughout, and top and bottom elements of appropriate form united to the top and bottom edge portions of said wall.

4. A centrifugal basket of the perforated wall type embracing a perforated cylindrical basket wall of uniform thickness throughout, comprising a metallic sheet bent into cylindrical form with its end edges integrally united in abutting relationship, thereby providing outlet perforations of equal depth substantially uniformly spaced apart, top and bottom elements united thereto by continuous welding seams, and a series of vertically spaced external reenforcing hoops secured around the basket wall and held in fixed spaced relationship to each other by spot welding.

5. A centrifugal basket for sugar refining and the like comprising a cylindrical perforated, peripheral wall, top and bottom walls welded to the top and bottom edge portions respectively of said cylindrical wall throughout its circumference, said top and bottom walls terminating at points adjacent said edges and leaving substantially the entire area of the cylindrical wall unobstructed thereby, said cylindrical wall having a multiplicity of perforations therein providing outlet openings for the uniform drainage of liquid from sugar throughout substantially the entire inside area of the wall during a centrifuging operation, said perforations being spaced substantially equi-distant each from the others adjacent thereto and being of substantially uniform dimensions whereby to enable uniform drainage of the liquid from the sugar.

6. A centrifugal basket for sugar refining and the like comprising a cylindrical, peripheral wall, top and bottom walls welded to the top and bottom edge portions respectively of said cylindrical wall throughout its circumference, said top and bottom walls terminating at points adjacent said edges and leaving substantially the entire area of the cylindrical wall unobstructed thereby, and a plurality of rigid annular reinforcing hoops fitted around the outside of said cylindrical wall and welded thereto in spaced relation to each other, said cylindrical wall having a plurality of parallel circumferential rows of perforations therein, all the perforations of one row being substantially equi-distant each from the other and each offset from, but substantially equi-distant from the nearest perforations of the rows next adjacent thereto whereby substantially uniform drainage facilities for removing liquid from sugar are provided, and said reenforcing hoops arranged between adjacent rows of perforations without interfering with the drainage of liquid through the perforations therein.

7. A light weight centrifugal basket for sugar refining and the like comprising a peripheral wall provided with perforations for uniformly purging liquid from sugar during a centrifuging operation, said wall comprising a metallic sheet of substantially uniform thickness bent to cylindrical form with its abutting edges welded together, a plurality of rigid seamless annular reenforcing hoops shrunk onto the outside of said wall and welded thereto whereby to strengthen the wall and maintain it in cylindrical form, a bottom member welded to the bottom of said wall adjacent its lower marginal edge, and a top member welded to the top of said wall adjacent its upper marginal edge.

8. A centrifugal basket of the type described comprising a cylindrical peripheral wall having outlet openings therein for the purging of liquid from sugar during a centrifuging operation and top and bottom elements united with said wall, the top and bottom rows of perforations being spaced a substantial distance from said top and bottom elements to leave smooth unbroken annular selvage areas of adequate width to form smooth sealing contacts with the subtending sealing selvages of a basket lining, thus preventing leakage of material around the top and bottom edges of the lining.

9. A centrifugal basket for sugar refining and the like comprising a cylindrical peripheral wall, appropriate top and bottom members united therewith, said wall having openings extending therethrough intermediate said top and bottom members to provide outlets for the drainage of liquid from sugar during a centrifuging operation, the openings in said wall nearest one of said members being spaced therefrom to provide a smooth unbroken marginal area on the interior of the wall of a width substantially greater than the radius of the drainage areas for the individual openings in the wall, a foraminate filter lining adjacent the inside of said wall including means at a marginal portion of the lining responsive to forces created by rotation of the basket to seal said portion of the lining against said marginal area and prevent leakage therebetween, the depth of said lining being slightly less than the inside depth of the wall whereby to enable expansion of the lining without distortion thereof.

10. A centrifugal basket for sugar refining and the like comprising appropriate top and bottom members and a cylindrical, perforated, peripheral wall welded to said top and bottom members adjacent its edges, said top and bottom members terminating adjacent the edges of the peripheral wall to leave substantially the entire wall unobstructed thereby, said wall having a plurality of parallel circumferential rows of perforations therein, the wall portion embracing the perforations of each row being of substantially uniform thickness circumferentially of the basket, and all of the perforations of each row being substantially equidistant each from the other and of substantially uniform depth and each off-set but substantially equidistant from the nearest perforations of the next adjacent rows, whereby a strong, light-weight basket having substantially uniform facilities for proper removal of liquid from sugar and the like is provided.

EUGENE ROBERTS.